US006962616B1

(12) United States Patent
Bandosz et al.

(10) Patent No.: US 6,962,616 B1
(45) Date of Patent: Nov. 8, 2005

(54) PREPARATION OF ADSORBENTS FROM ORGANIC FERTILIZER AND MINERAL OIL AND THEIR APPLICATION FOR REMOVAL OF ACIDIC GASES FROM SULFUR CONTAINING WET GAS STREAMS

(75) Inventors: Teresa J. Bandosz, Teaneck, NJ (US); Andriy Bahryeyev, New York, NY (US)

(73) Assignee: Research Foundation of The City University of New York, New York, NY (US)

( * ) Notice: Subject to any disclaimer, the term of this patent is extended or adjusted under 35 U.S.C. 154(b) by 93 days.

(21) Appl. No.: 10/638,291

(22) Filed: Aug. 8, 2003

(51) Int. Cl.[7] .............................................. B01D 53/04
(52) U.S. Cl. ........................ 95/129; 95/136; 95/137; 95/141; 95/900; 96/108; 55/DIG. 5; 423/230; 423/244.03; 502/423; 502/428
(58) Field of Search ....................... 95/129, 136, 137, 95/141, 900; 96/108; 55/DIG. 5; 423/230, 423/244.01, 244.03; 502/423, 424, 428, 430

(56) References Cited

U.S. PATENT DOCUMENTS

| | | | |
|---|---|---|---|
| 3,619,420 A | 11/1971 | Kemmer et al. | |
| 3,887,461 A | 6/1975 | Nickerson et al. | |
| 3,998,756 A | 12/1976 | Sutherland | |
| 4,122,036 A | 10/1978 | Lewis | |
| 4,273,751 A * | 6/1981 | Sinha et al. | 423/244.03 |
| 4,921,826 A * | 5/1990 | Juntgen et al. | 502/180 |
| 5,024,682 A * | 6/1991 | Turk | 95/136 |
| 5,338,462 A | 8/1994 | Abe et al. | |
| 5,356,849 A | 10/1994 | Matviya et al. | |
| 5,455,013 A * | 10/1995 | Shibata et al. | 423/230 |
| 5,494,869 A * | 2/1996 | Hayden et al. | 502/22 |
| 6,030,922 A | 2/2000 | Khalili et al. | |
| 6,126,911 A * | 10/2000 | Scranton, Jr. | 423/230 |
| 6,585,900 B2 * | 7/2003 | Cabello-Fuentes | 210/764 |
| 2002/0100367 A1 * | 8/2002 | Bandosz et al. | 95/129 |

FOREIGN PATENT DOCUMENTS

| | | |
|---|---|---|
| DE | 41 02 557 A1 | 7/1992 |
| EP | 0610781 A1 * | 8/1994 |
| EP | 0729783 A2 | 9/1996 |
| GB | 1 385 453 | 2/1975 |
| JP | 11057399 | 3/1999 |
| JP | 2000319011 | 11/2000 |

OTHER PUBLICATIONS

Adib et al., J. Colloid Interface Sci., "Effect of Surface Characteristics of Wood-Based Activated Carbons on Adsorption of Hydrogen Sulfide", 214; 407-415, 1999.

Cariaso et al., Carbon, "Oxidation of Hydrogen Sulfide Over Microporous Carbons", 13:233-239, 1975.

Katoh et al., Environ., "Studies of the Oxidation Mechanism of Sulphur-Containing Gases on Wet Activated Carbon Fibre", 6, 255-262, 1996.

Lu, Environ. Tech., 16, 495, 1995.

Stejns et al., Ind. Eng. Chem. Prod. Res. Dev., "Catalytic Oxidation of Hydrogen Sulfide. Influence of Pore Structure and Chemical Composition of Various Porous Substances", 16, 35-41, 1977.

Lu, et al. Fuel, "Surface Area Development of Sewage Sludge During Pyrolysis" vol. 74, No. 3 pp 344-348, 1995.

Chiang, P.C. et al., The Canadian Journal of Chemical Engineering, vol. 65, "Use of Sewage Sludge for Manufacturing Adsorbents", pp. 922-927, Dec. 1987.

Lu, G.Q. et al. Gas Sep. Purif., vol. 10, No. 2 "Characterisation of Sewage Sludge-Derived Absorbents for $H_2S$ Removal. Part 2: Surface and Pore Structural Evolution in Chemical Activation", pp. 103-111, 1996.

Lu, G.Q., Env. Progress, vol. 15, No. 1, "Preparation and Evaluation of Adsorbents From Waste Carbonaceous Material For $SO_x$ and $NO_x$ Removal", pp. 12-18, Spring 1996.

Piskorz, J., et al., Ind. Eng. Chem. Process Des. Dev. vol. 25, "Flash Pyrolysis of Sewage Sludge", pp. 265-270, 1986.

Bagreev, A., et al., Elsevier Science Ltd., Carbon 39, "Pore Structure and Surface Chemistry of Adsorbents Obtained by Pyrolysis of Sewage Sludge-Derived Fertilizer", pp. 1971-1979, 2001.

Bagreev, A., et al., Environ. Sci. Technol, vol. 35, "Sewage Sludge-Derived Materials as Efficient Adsorbents for Removal of Hydrogen Sulfide", pp. 1537-1543, 2001.

Bashkova, S., et al., Environ. Sci. Technol, vol. 35, "Adsorption od $So_2$ on Sewage Sludge-Derived Materials", pp. 3263-3269, 2001.

M. Tettamanti et al., Environ. Sci. Technol, vol. 35, "Thermal Oxidation Kinetics and Mechanism of Sludge From a Wastewater Treatment Plant", pp. 3981-3987, 2001.

International Search Report of PCT/US01/44523.

* cited by examiner

Primary Examiner—Robert H. Spitzer
(74) Attorney, Agent, or Firm—Darby & Darby (57) ABSTRACT

A method of making an adsorbent which includes: a) thermally drying dewatered sewage sludge to form granulated organic fertilizer; b) treating the fertilizer with mineral oil; and c) pyrolyzing the treated fertilizer at temperatures between about 600° C. and about 1000° C. The disclosure is also directed to adsorbents made by this method and to the processes of removing acidic gas or gases from wet gas streams by putting an adsorbent in contact with the wet gas stream and allowing the adsorbent to adsorb the acidic gas or gases.

20 Claims, 9 Drawing Sheets

PREPARATION OF ADSORBENTS FROM ORGANIC FERTILIZER AND MINERAL OIL AND THEIR APPLICATION FOR REMOVAL OF ACIDIC GASES FROM SULFUR CONTAINING WET GAS STREAMS

FIELD OF THE INVENTION

This invention is directed to a process for preparing adsorbents from sewage sludge-derived organic fertilizer treated with mineral oil. The invention is also directed to absorbents prepared by this process and to processes for removing acidic gases from sulfur-containing wet gas streams using the absorbents.

BACKGROUND OF THE INVENTION

All references cited and discussed below in this specification are incorporated herein by reference in their entirety and to the same extent as if each reference was individually incorporated by reference. In the case of conflicting terminology, the present disclosure shall control.

Growing concerns about the environment have resulted in the development of new environmentally friendly technologies, new materials, and new ways to reduce and minimize wastes. One of the wastes produced by contemporary society in abundant quantity is municipal sewage sludge, euphemistically often referred to as biosolids. Biosolids are a mixture of exhausted biomass generated in the aerobic and anaerobic digestion of the organic constituents of municipal sewage along with inorganic materials such as sand and metal oxides.

Various methods have been proposed for the disposal of municipal sewage sludge, including ocean dumping, landfilling, cropland application and incineration. Other methods that have been used to dispose of or utilize municipal sewage sludge include road surfacing, conversion to fertilizer, compression into building blocks, and carbonization.

The application of raw sewage sludge as a fertilizer produces odor problems and is also associated with the risk of contamination of the soil by heavy metals and pathogens. A more efficaceous and safer alternative is the pyrolytic carbonization of sludge to obtain useful sorbents.

Carbonization of sludge in the presence of chemical activating agents, such as zinc chloride and sulfuric acid produces sorbents, having applications in processes such as removal of organics and chlorinated organics in the final stages of water cleaning.

The process of carbonization of biosolids has been studied in detail using different chemical agents and various conditions. In general, materials obtained as a result of the treatment have surface areas between 100 and 500 m$^2$/g, but their performance as adsorbents has been demonstrated to be much worse than that of activated carbons.

Since hydrogen sulfide ($H_2S$) is the main source of odor from waste water treatment plants, the possibility of using sewage sludge as a source of adsorbents for $H_2S$ is appealing. Because sewage sludge contains a considerable amount of organic nitrogen, carbonization of such species can lead to the creation of basic nitrogen groups within the carbon matrix which have been proven to be important in the oxidation of $H_2S$. Another advantage to the use of sludge as a starting material is the presence of significant amounts of iron that is added to the raw sludge as a dewatering conditioner. This is considered to be a catalyst for $H_2S$ oxidation.

Primarily, caustic-impregnated carbons have been used as adsorbents of hydrogen sulfide at waste water treatment plants. Because of the presence of caustic compounds, such as KOH or NaOH, their pH is high, and hydrogen sulfide is oxidized to elemental sulfur. The process is fast and caustic-impregnated carbons have high hydrogen sulfide breakthrough capacity, around 140 mg/g, measured using accelerated test.

Caustic-impregnated carbons, although efficient for $H_2S$ removal, have many disadvantages. The disadvantages of caustic-impregnated carbons include the following:
1) limited capacity for physical adsorption of volatile organic compounds (VOCs) due to the presence of caustic materials in the carbon pore system;
2) low self-ignition temperature which may result in fire inside the carbon vessel;
3) special safety precautions in dealing with caustic materials have to be applied;
4) high density because of the presence of water; and
5) higher cost than that of unmodified carbons.

Thus, there is a great interest in the development of new types of adsorbents for use in waste water treatment facilities.

The following patents and publications provide relevant background to the present invention:

U.S. Pat. Nos. 3,619,420, 3,998,756, 3,887,461, 4,122,036, and 5,356,849; Adib et al., J. Colloid Interface Sci., 1999, 214, 407–415; Cariaso et al., Carbon, 1975, 13: 233–239; Chiang et al., Can. J. Chem. Eng., 1987, 65: 922–927; Katoh et al., Appl. Cat. B: Environ., 1995, 6: 255–262; Lu et al., Fuel, 1995, 74: 344–348; Lu et al., Gas Sep Purif., 1996, 10: 103–111; Lu et al. Environ Tech., 1995, 16, 495; Piskorz et al., Ind. Proc. Des. Dev., 1996, 25: 265–270; and Stejns et al., Ind. Eng. Chem. Prod. Res. Dev., 1977; 16: 35–41.

SUMMARY OF THE INVENTION

This invention is directed to a method of making an adsorbent including: a) thermally drying dewatered sewage sludge to form granulated organic fertilizer; b) treating the fertilizer with mineral oil; and c) pyrolyzing the treated organic fertilizer at temperatures between about 600° C. and about 1000° C. The invention is also drawn to adsorbents made by this method and to processes for removing acidic gases from wet gas streams by contacting an adsorbent of the invention with the wet gas stream and allowing the adsorbent to adsorb the acidic gases.

DETAILED DESCRIPTION OF THE INVENTION

Some of the terms of the invention may be defined as follows.

Adsorption: The surface of a solid always accumulates molecules from its gaseous or liquid environment; this phenomenon is called adsorption.

Adsorbent: A material that is able to adsorb considerable amounts of gases or vapors under certain conditions.

Pyrolysis: Heat treatment (typically over 400b° C.) in an inert atmosphere of materials having organic origin.

Chemical activation: Treatment of organic precursors with certain chemicals during pyrolysis.

Activated carbon: A carbonaceous material obtained by pyrolysis of organic precursors (coal, wood, peat, etc.) at elevated temperatures followed by their activation using various physical or chemical agents (at temperatures between about 600° C. and about 1000° C.).

Caustic-impregnated activated carbon (CIAC): Activated carbons impregnated with caustic materials, such as KOH or NaOH, in order to increase their pH and adsorption capacity for acidic gases.

Breakthrough capacity: The amount of substance adsorbed on the sorbent surface until the substance is detected in effluent air at a certain concentration level.

Acidic gases: Gases able to be transformed into acids or gases able to interact as acids (electron acceptors).

Specific surface area: The surface area per unit weight of adsorbent considered to be the area where adsorption of various molecules can occur.

Pore volume: The volume of pores in an adsorbent calculated as available to nitrogen molecules at its boiling point.

Oxidation: Change in the chemical stage of a substance associated with an electron loss. The charge on the species becomes more positive.

Specific adsorption: the amount of substance adsorbed on the unit of surface area of the adsorbents.

Residence time: An average time to be spent by reactant molecules in order to pass through the reactor.

This invention is drawn to a method of making an adsorbent which includes: a) thermally drying dewatered sewage sludge to form granulated organic fertilizer; b) treating the fertilizer with mineral oil; and c) pyrolyzing the treated organic fertilizer.

The mineral oil treating step includes impregnating the granulated organic fertilizer with mineral oil. In one embodiment, the treating stage includes (i) adding the mineral oil to the fertilizer, (ii) mixing the mineral oil and fertilizer for a short period of time, typically, but not limited to, about 15 minutes, and (iii) having a further hold period, during which time the mineral oil becomes adsorbed into the pore system of the fertilizer mixture, i.e. the fertilizer becomes impregnated with the mineral oil. During this hold period, the mixture may be stirred gently or left standing with no agitation. In a preferred embodiment, the fertilizer is impregnated with between about 5 and about 30 wt % mineral oil at temperatures of between about 20° C. and about 100° C., with a hold period of between about 1 hour and 24 hours. In a more preferred embodiment, the fertilizer is impregnated with between about 10 and about 25 wt % mineral oil at temperatures of between about 20° C. and about 60° C. with a hold period of between about 1 hour and 4 hours. Any mineral oil may be used for the impregnation step. The mineral oil is typically, but not limited to, a $C_{14}$–$C_{18}$ petroleum hydrocarbon product, optionally containing one or more heteroatoms such as sulfur, oxygen or nitrogen, having a boiling point of about 270° C. to about 360° C. Suitable mineral oils include, but are not limited to, light mineral oil, heavy mineral oil, natural mineral oil, synthetic mineral oil and any combination thereof. Spent motor oil is a specific example of a suitable mineral oil.

In one embodiment, the pyrolysis stage is conducted at temperatures between about 600° C. and 1000° C., with hold times of between about 0.5 and about 4 hours. In a preferred embodiment, the pyrolysis is conducted at temperatures between about 800° C. and 950° C., with hold times of between about 0.5 and about 2 hours. Heating rates may vary between about 1 and about 50° C./minute. In a preferred embodiment the heating rates are between about 10 and about 30° C./minute. The pyrolysis stage is considered complete when essentially no flame is observed from the combustion of exhaust gases.

The invention is also directed to an absorbent formed by the process of a) thermally drying dewatered sewage sludge to form granulated organic fertilizer; b) treating the fertilizer with mineral oil; and c) pyrolyzing the treated organic fertilizer at temperatures between about 600° C. and about 1000° C. The resulting mineral oil-treated adsorbents include (a) porous activated carbon (approximately 20%) with incorporated organic nitrogen species, and (b) inorganic matter (65–75%) with highly dispersed catalytic oxides including one or more of iron oxide, copper oxide, zinc oxide, calcium oxide, alumina and silica. The organic nitrogen species include amine or pyridine groups. The specific surface area of the absorbent is about 100 to about 500 m²/g, and the pore volume is about 0.05 to about 0.4 cm³/g.

The invention is further directed to a process for removing an acidic gas or gases from wet gas streams including (a) forming an adsorbent by thermally drying dewatered sewage sludge to form granulated organic fertilizer; (b) treating the fertilizer with mineral oil; (c) pyrolyzing the treated organic fertilizer at temperatures between about 600° C. and about 1000° C.; (d) contacting said adsorbent with the wet gas stream; and (e) allowing the adsorbent to adsorb the acidic gas or gases. In one embodiment, the acidic gases include one or more of hydrogen sulfide, methyl mercaptan, sulfur dioxide, hydrogen cyanide, and nitrogen dioxide. In another embodiment, the acidic gas is hydrogen sulfide which reacts with inorganic matter present in the adsorbent, to be oxidized to sulfur dioxide or elemental sulfur and salt forms thereof. In a further embodiment, the wet gas stream is effluent from a waste water treatment plant, gaseous fuel, or gases from hydrothermal vents.

The mineral oil-treated adsorbents have numerous beneficial properties. Since the adsorbents are obtained from sewage sludge, a significant amount of municipal waste can be recycled and reused in waste water treatment plants. Additionally, spent mineral oil from automobiles can be used in the formation of the adsorbents to further minimize hazardous wastes. The adsorbents are useful in the desulfurization of gaseous fuels and in hydrothermal vents, and may be useful in the removal of $SO_2$ from power plant effluent gases. The kinetics of the removal process are very fast and a low amount of heat is released. During adsorption, $H_2S$ reacts with inorganic matter and is oxidized to elemental sulfur or sulfur dioxide. The exhausted adsorbent material may be regenerated by heating. A typical, non limiting, heating temperature for regeneration is between 300° C. and about 500° C.

Significant changes in the chemical and physical nature of carbon-mineral sorbents are observed by pyrolysis of the mineral oil-treated thermally-dried sewage sludge fertilizer product in pellet form, Granulite. Granulite is available from New York Organic Fertilizer Company, a wholly owned-subsidiary of Synagro, Inc. (Bronx, N.Y.), in the form of 3 mm diameter granules with about 5% water content. The unique surface chemistry of Granulite results from a combination of acidity from metal oxides such as silica, alumina, and iron oxide, and basicity from calcium carbonates and from organic nitrogen in the form of amine or pyridine-like groups. The presence of basic nitrogen, calcium, and iron can hold significant advantages for the application of these types of materials as sorbents for acidic gases.

The mineral oil-treated adsorbents have advantageous properties in hydrogen sulfide removal. The mineral oil-treated adsorbents have approximately a three times higher capacity for hydrogen sulfide removal than unmodified carbons, i.e. those carbons that have received no further treatment after carbonization and activation. The mineral oil-treated adsorbents also have an approximately 30% higher capacity for hydrogen sulfide removal than adsorbents prepared by pyrolysis without prior treatment with mineral oil (simple pyrolysis). The capacity of the mineral oil-treated adsorbents for hydrogen sulfide removal is comparable to that for caustic impregnated carbons.

The following Examples are provided to further illustrate the invention, but are not intended to be limiting.

EXAMPLES

A. Synthesis of Mineral Oil-Treated Adsorbent Materials (SLOL-600, SLOL-800, SLOL-950)

Granulite was obtained from New York Organic Fertilizer Company in the form of 3 mm diameter granules with about 5% water content. The results of the chemical analysis of Granulite (Pace Analytical Services) are presented in Table 1. The adsorbents studied were prepared by treatment of the Granulite with 20 wt % spent mineral oil at a temperature of 30° C. with a hold period of 1 hour, followed by pyrolysis of the mineral oil-treated Granulite at temperatures between 600° C. and 950° C. in a nitrogen atmosphere in a fixed bed (horizontal furnace). The pyrolysis occurred with a heating rate of 10° C./min and a hold time at the final pyrolysis temperature of 1 hour. The samples were then cooled to 30° C. under a nitrogen atmosphere. The adsorbents formed include about 20% porous activated carbon with incorporated organic nitrogen species and 65–76% inorganic matter with highly dispersed catalytic oxides such as iron, copper, zinc and calcium oxides, alumina, and silica. SLOL-600, having a bulk density of 0.56, was formed by pyrolysis at 600° C. in 37.2% yield; SLOL-800, having a bulk density of 0.56, was formed by pyrolysis at 800° C. in 32.8% yield; and SLOL-950, having a bulk density of 0.55, was formed by pyrolysis at 950° C. in 31.4% yield.

TABLE 1

Results of the chemical analysis of Granulite

| Element | Content [ppm] |
| --- | --- |
| Aluminum | 7410 |
| Arsenic | 5.97 |
| Cadmium | 3.52 |
| Calcium | 20300 |
| Chromium | 73.2 |
| Cobalt | 10.2 |
| Copper | 932 |
| Iron | 26600 |
| Lead | 280 |
| Magnesium | 5550 |
| Molybdenum | 13.2 |
| Nickel | 44.6 |
| Potassium | 960 |
| Selenium | 6.09 |
| Silver | ND |
| Zinc | 1290 |
| Sulfur | 0.70% |
| Nitrogen | 1.82% |
| Phosphorus | 3.17% |
| pH | 7.08 |
| Bulk density | 0.78 g/cm³ |
| Density | 1.21 g/cm³ |
| Fixed solids | 65.3% |
| Volatile solids | 34.7% |

B. Methods of Making Organic Fertilizer

The adsorbents of this invention may be made from any thermally dried dewatered biosolid, organic fertilizer, as a precursor. In one embodiment, Granulite, obtained in the form of 3 mm diameter granules with about 5% water content, may be used as the precursor to the adsorbent. Thermally dried dewatered biosolids may be made by the following general method (Wheelabrator Technologies, Inc.). Dewatered biosolids cake is mixed with recycled dry biosolids to produce a granular feed for dryers, such as rotary dryers. The resulting biosolids feed is dried using a stream of hot air at temperatures of between about 120° C. and 160° C., to yield granulated organic fertilizer with approximately five percent water content. If a rotary dryer is used, the tumbling action of the dryers creates round pellets, which may be separated by size. Pellets of the desired size may be separated, while undersized and crushed pellets may be recycled for use as recycled dried biosolids in the first step of producing granular feed for the dryers.

C. Methods of Studying Materials

Nitrogen Adsorption

Nitrogen adsorption isotherms were measured using an ASAP 2010 analyzer (Micromeritics, Norcross, Ga., USA) at −196° C. Before the experiment, the samples were degassed at 120° C. to a constant pressure of $10^{-5}$ torr. The isotherms were used to calculate the specific surface area ($S_{DFT}$); total surface area ($S_{tot}$); micropore surface area ($S_{mic}$); micropore volume ($V_{mic}$); mesopore volume ($V_{mes}$); total pore volume ($V_{tot}$) at $p/p_0=0.99$ ($p/p_0$ is the relative pressure); and pore size distribution. All the parameters were determined using the Density Functional Theory (DFT) method (see Lastoskie C M, Gubbins K E, Quirke N, J. Phys. Chem., 1993; 97: 4786–4796; Olivier JP, J. Porous Materials, 1995; 2: 9–17) or the Dubinin-Raduskevich (DR) method (see Dubinin M M, In Chemistry and Physics of Carbon; Walker, PL, Ed.; Vol. 2. Marcel Dekker: New York, 1966). The relative microporosity was calculated, using the DR method, as the ratio of micropore volume to total pore volume ($V_{mic}/V_{tot}$). In some cases, BET surface area ($S_{BET}$), and the total pore volume evaluated from the last point of the isotherm ($V_{tot}$) were calculated.

pH

A 0.4 g sample of dry adsorbent was added to 20 mL of water and the suspension stirred overnight to reach equilibrium. The sample was filtered and the pH of solution measured using an Accumet Basic pH meter (Fisher Scientific, Springfield, N.J., USA).

Thermal Analysis

Thermal analysis was carried out using TA Instruments Thermal Analyzer (New Castle, Del., USA). The heating rate was 10° C./min in a nitrogen atmosphere at 100 mL/min flow rate. TGA is thermogravimetric analysis. DTA is differential thermal analysis. DTG is differential thermogravimetric analysis. TG is thermogravimetry.

$H_2S$ Breakthrough Capacity

Dynamic tests were carried out at room temperature to evaluate the capacity of the various sorbents for $H_2S$ removal. Adsorbent samples were packed into a column (column length 60 mm, column diameter 9 mm, bed length 60 mm, bed volume 6 $cm^3$) and prehumidified with moist air (relative humidity 80% at 25° C.) for an hour. The amount of adsorbed water was estimated from the increase in the sample weight. Moist air (relative humidity 80% at 25° C.) containing 0.3% (3000 ppm) $H_2S$ was then passed through the column of adsorbent at 0.5 L/min. The elution of $H_2S$ was monitored using an Interscan LD-17 $H_2S$ continuous monitor system interfaced with a computer data acquisition program. The test was stopped at a $H_2S$ breakthrough concentration of 500 ppm. The adsorption capacities of each sorbent in terms of mg of $H_2S$ per gram of adsorbent were calculated by integration of the area above the breakthrough curves, and from the $H_2S$ concentration in the inlet gas, flow rate, breakthrough time, and mass of sorbent. After exhaustion of its $H_2S$ adsorption capacity, each sample is identified by the letter "E" added to its designation.

$SO_2$ Breakthrough Capacity

Dynamic tests were carried out at room temperature to evaluate the capacity of the various sorbents for $SO_2$ removal. Adsorbent samples were packed into a column (column length 60 mm, column diameter 9 mm, bed length 60 mm, bed volume 6 $cm^3$) and prehumidified with moist air (relative humidity 80% at 25° C.) for an hour. The amount of adsorbed water was estimated from the increase in the sample weight. Moist air (relative humidity 80% at 25° C.) containing 0.3% (3000 ppm) $SO_2$ was then passed through the column of adsorbent at 0.5 L/min. The elution of $SO_2$ was monitored using a MiniMax monitor system. The test was stopped at an $SO_2$ breakthrough concentration of 300 ppm. The adsorption capacities of each sample in terms of mg of $SO_2$ per gram of adsorbent were calculated by integration of the area above the breakthrough curves, and from the $SO_2$ concentration in the inlet gas, flow rate, breakthrough time, and mass of sorbent. After exhaustion of its $SO_2$ adsorption capacity, each sample is identified by the letter "E" added to its designation.

D. Results and Discussion Concerning Materials SLOL-600, SLOL-800, SLOL-950 and SLOL-600E, SLOL-800E, SLOL-950E.

Elemental Analysis

The analytical data presented in Table 1 shows that the thermally-dried Granulite sludge pellets have a high content of inorganic matter, especially metals such as iron and calcium, that may be beneficial in the catalytic oxidation of hydrogen sulfide. As expected for this digested municipal sludge product, the organic nitrogen, phosphorus and sulfur content is also high. The analysis does not include carbon, but based on the results of previous studies, the total organic matter in the sludge product is expected to be about 70% (w/w).

The results of a metal content analysis of the mineral oil-treated adsorbents prepared according to the invention (SLOL-600, SLOL-800 and SLOL-950), along with the corresponding non mineral oil-treated adsorbents prepared by simple pyrolysis (SP-400, SP-600, SP-800 and SP-950) are given in Table 2.

TABLE 2

Results of a Metal Content Analysis of the Adsorbent Materials

| Sample | Al (ppm) | Cr (ppm) | Cu (ppm) | Fe (ppm) | Pb (ppm) | K (ppm) | Zn (ppm) | Ca (ppm) | Total Metals (%) |
|---|---|---|---|---|---|---|---|---|---|
| SP-400 | 15200 | 123 | 1440 | 49150 | 519 | 1889 | 2260 | 39650 | 11.04 |
| SP-600 | 19900 | 106 | 1385 | 54450 | 504 | 2715 | 2340 | 4120 | 12.28 |
| SP-800 | 21550 | 65.3 | 1845 | 61250 | 304 | 3796 | 1720 | 45700 | 13.64 |
| SP-950 | 21300 | 114 | 1785 | 66350 | 20 | 3449 | 41.8 | 47400 | 14.07 |
| SLOL-600 | 18200 | 83.2 | 1270 | 50400 | 437 | 2511 | 24100 | 40450 | 11.59 |
| SLOL-800 | 20000 | 46.8 | 1430 | 57150 | 209 | 3336 | 1780 | 41450 | 12.56 |
| SLOL-950 | 23100 | 124 | 1790 | 67250 | 17 | 3441 | 32.4 | 49000 | 14.49 |

Thermal Analysis

Figure 1:
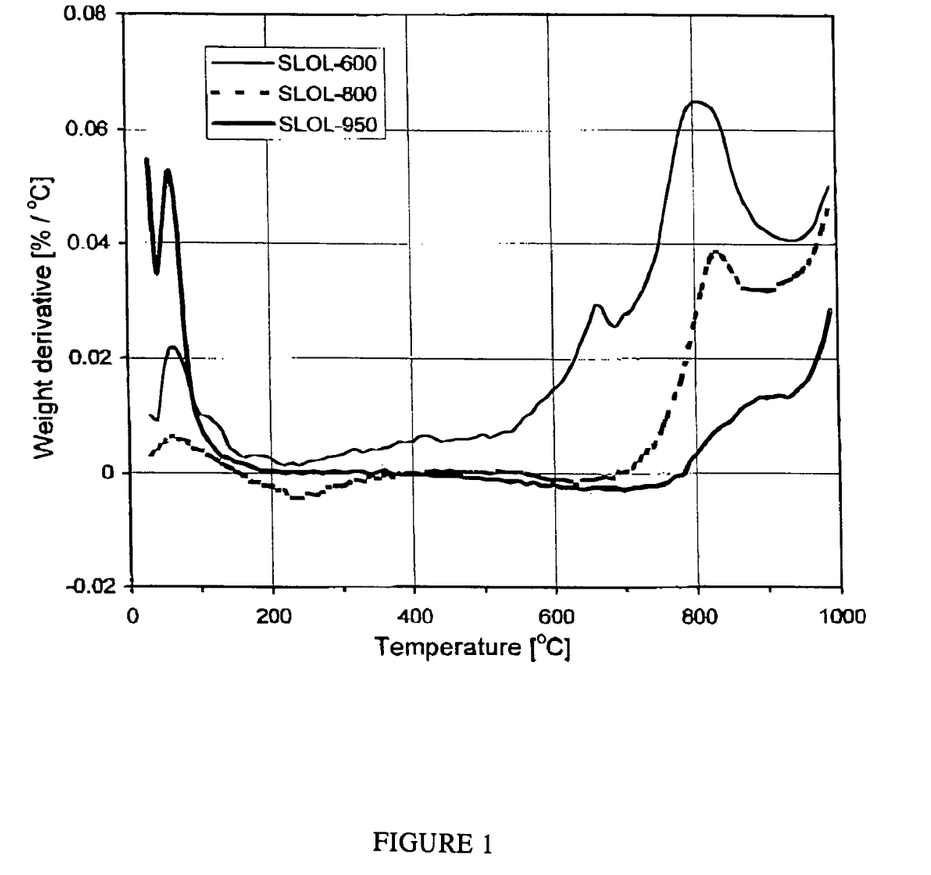
FIG. 1. Differential Thermogravimetric Analysis (DTG) curves (nitrogen atmosphere) for adsorbents obtained from sewage sludge derived fertilizer treated with mineral oil and pyrolyzed at 600° C., 800° C. and 950° C. (SLOL-600, SLOL-800, SLOL-950).

The results of the thermal analysis in nitrogen of the oil-treated adsorbents is set forth in FIG. 1, and outlined in Table 3 for analysis in nitrogen and in air. The carbon content of SLOL-950 is higher than that of SLOL-800. There is also a difference in the ignition temperature between these two samples. SLOL-950 is much more thermally stable than SLOL-800, in spite of a higher organic matter content. Without wishing to be bound by theory, this presumably is a result of the removal of oxygen containing functional groups from the carbonaceous matrix. Release of oxygen from these groups lowers the ignition temperature of the adsorbents.

TABLE 3

Thermal Analysis of the Oil-Treated Adsorbents

| Sample | Weight loss in nitrogen (%) | Weight loss in air (%) | Ash Content (%) | Carbon Content (%) | Ignition Temperature (° C.) |
|---|---|---|---|---|---|
| SLOL-600 | 10.5 | 32.4 | 67.6 | 21.9 | 380 |
| SLOL-800 | 8 | 25 | 75 | 17 | 461 |
| SLOL-950 | 4.2 | 22.9 | 77.1 | 18.7 | 523 |

Adsorption Isotherms

Figure 2:
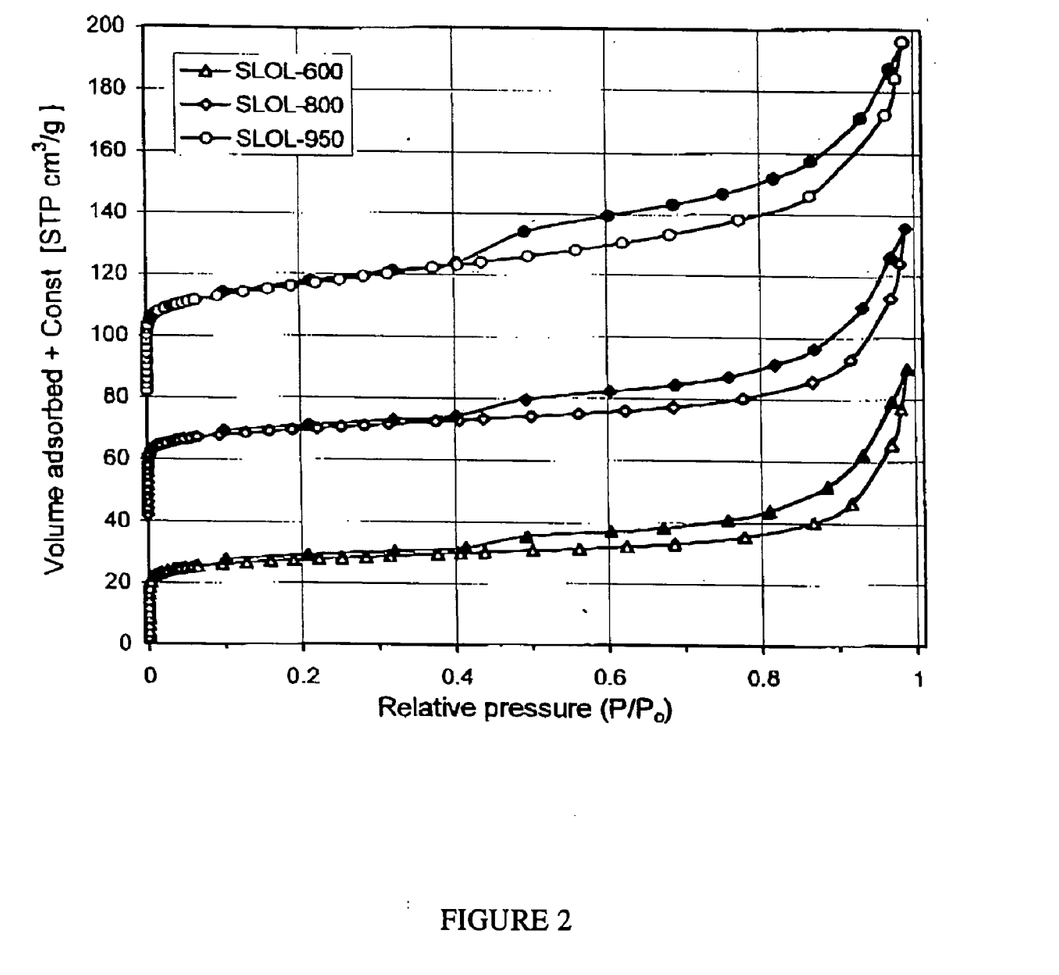
FIG. 2. Nitrogen adsorption isotherms for adsorbents obtained from sewage sludge derived fertilizer treated with mineral oil and pyrolyzed at 600° C., 800° C. and 950° C. (SLOL-600, SLOL-800, SLOL-950).
Figure 3:
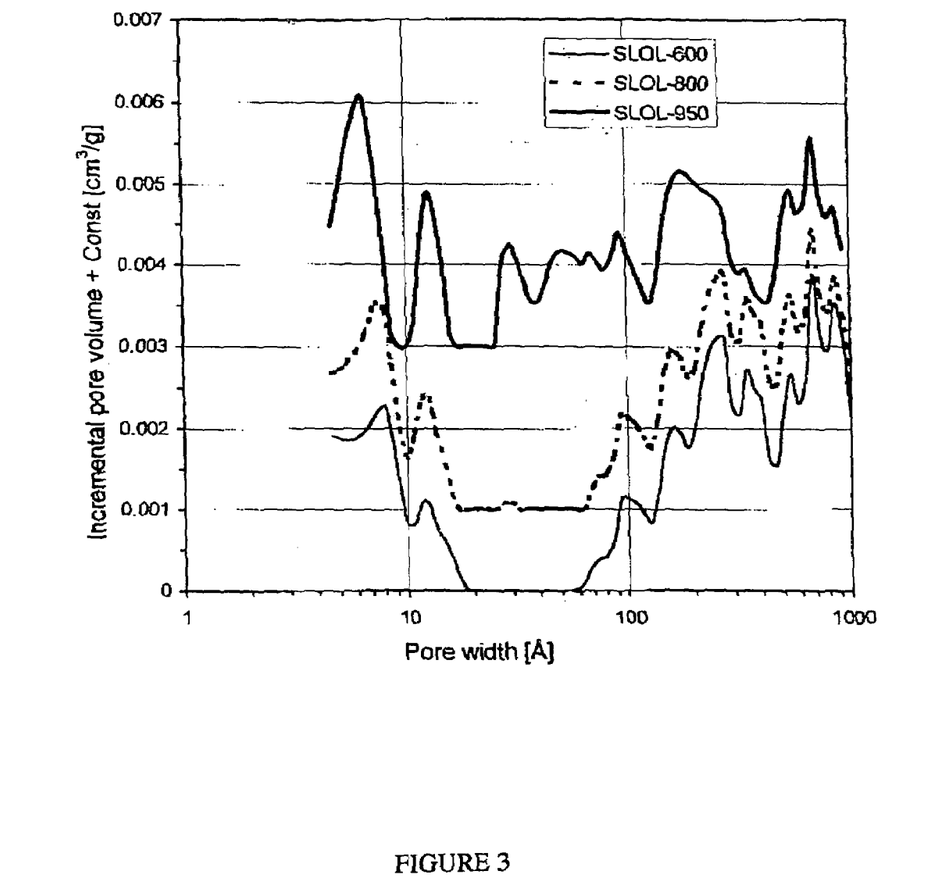
FIG. 3. Pore size distributions for adsorbents obtained from sewage sludge derived fertilizer treated with mineral oil and pyrolyzed at 600° C., 800° C. and 950° C. (SLOL-600, SLOL-800, SLOL-950).

The pore structure of the oil-treated adsorbents was determined using sorption of nitrogen at its boiling point. The nitrogen adsorption isotherms are presented in FIG. 2. As can be seen, the sorption uptake increases with increasing pyrolysis temperature. The shape of the isotherms and the presence of hysteresis loops indicates that the oil-treated adsorbents possess a mixed micro- and meso-porous structure. From these isotherms, the pore size distributions were calculated using DFT, and are presented in FIG. 3. SLOL-600 and SLOL-800 have similar pore structures, while the structure of SLOL-950 differs significantly. The micropores are smaller for SLOL-950, and their volume is higher. Additionally, it can be seen that the volume of pores larger than 200 Å decreases significantly during pyrolysis at 950° C. and new pores in the mesopore range (30–100 Å) are observed. This is likely due to thermal changes in the inorganic matter. During carbonization at 950° C. in a reducing atmosphere, inorganic salts and oxides decompose releasing oxygen which acts as a pore-former. This is reflected in an increase in the volume of very small pores (<7 Å).

The nitrogen adsorption isotherms were used to calculate the structural parameters for the adsorbents presented in Table 4. All the parameters were determined using the Density Functional Theory (DFT) method and the Dubinin-Raduskevich (DR) method.

TABLE 4

Structural parameters calculated from nitrogen adsorption isotherms.

| Sample | $S_{BET}$ [m²/g] | $V_{mic\ (DR)}$ [cm³/g] | $V_{mic\ (DFT)}$ [cm³/g] | $V_{mes\ (DFT)}$ [cm³/g] | $V_{tot\ (DFT)}$ [cm³/g] | $S_{mic\ (DFT)}$ [m²/g] | $S_{tot\ (DFT)}$ [m²/g] | pH | $V_{tot}$ [cm³/g] |
|---|---|---|---|---|---|---|---|---|---|
| SLOL-600 | 90 | 0.041 | 0.025 | 0.047 | 0.106 | 69 | 91 | 10.83 | 0.139 |
| SLOL-800 | 97 | 0.044 | 0.025 | 0.045 | 0.101 | 67 | 105 | 11.05 | 0.149 |
| SLOL-950 | 117 | 0.048 | 0.022 | 0.047 | 0.087 | 61 | 99 | 11.26 | 0.176 |
| SLOL-600E | 16 | 0.007 | 0.022 | 0.040 | 0.067 | 3 | 10 | 9.9 | 0.082 |
| SLOL-800E | 19 | 0.008 | 0.003 | 0.051 | 0.091 | 4 | 13 | 10.2 | 0.085 |
| SLOL-950E | 30 | 0.011 | 0.002 | 0.054 | 0.097 | 3 | 20 | 9.5 | 0.086 |
| SLOL-600E SO₂ | 28 | 0.011 | 0.003 | 0.041 | 0.081 | 5 | 24 | 7.4 | 0.106 |
| SLOL-800E SO₂ | 40 | 0.016 | 0.007 | 0.031 | 0.069 | 16 | 40 | 8.5 | 0.103 |

TABLE 4-continued

Structural parameters calculated from nitrogen adsorption isotherms.

| Sample | $S_{BET}$ [m$^2$/g] | $V_{mic\ (DR)}$ [cm$^3$/g] | $V_{mic\ (DFT)}$ [cm$^3$/g] | $V_{mes\ (DFT)}$ [cm$^3$/g] | $V_{tot\ (DFT)}$ [cm$^3$/g] | $S_{mic\ (DFT)}$ [m$^2$/g] | $S_{tot\ (DFT)}$ [m$^2$/g] | pH | $V_{tot}$ [cm$^3$/g] |
|---|---|---|---|---|---|---|---|---|---|
| SLOL-950E SO$_2$ | 60 | 0.024 | 0.009 | 0.056 | 0.100 | 22 | 63 | 7.3 | 0.137 |

(DR = Dubinin-Radushkevich method; DFT = density functional theory; E = exhausted sample after H$_2$S or SO$_2$ adsorption test)

H$_2$S and SO$_2$ Breakthrough/Adsorption Studies

The oil-treated adsorbent materials were studied as hydrogen sulfide and sulfur dioxide adsorbents in the dynamic tests described below. After exhaustion of its adsorbent capacity, each sample is identified by adding the letter "E" to its designation.

For comparison purposes, the adsorption experiments were also performed using the as-received carbon (S-208) manufactured from coconut shells by Watelink Barnabey and Sutcliffe (Columbus, Ohio). This sorbent is produced in the form of 6.4×3.2 mm pellets. To provide the same dynamic conditions for the comparison experiment, S-208 carbon was granulated and the fraction with the same size (1–3 mm) as the mineral oil-treated pyrolyzed Granulite employed for the adsorption experiments.

Figure 4:
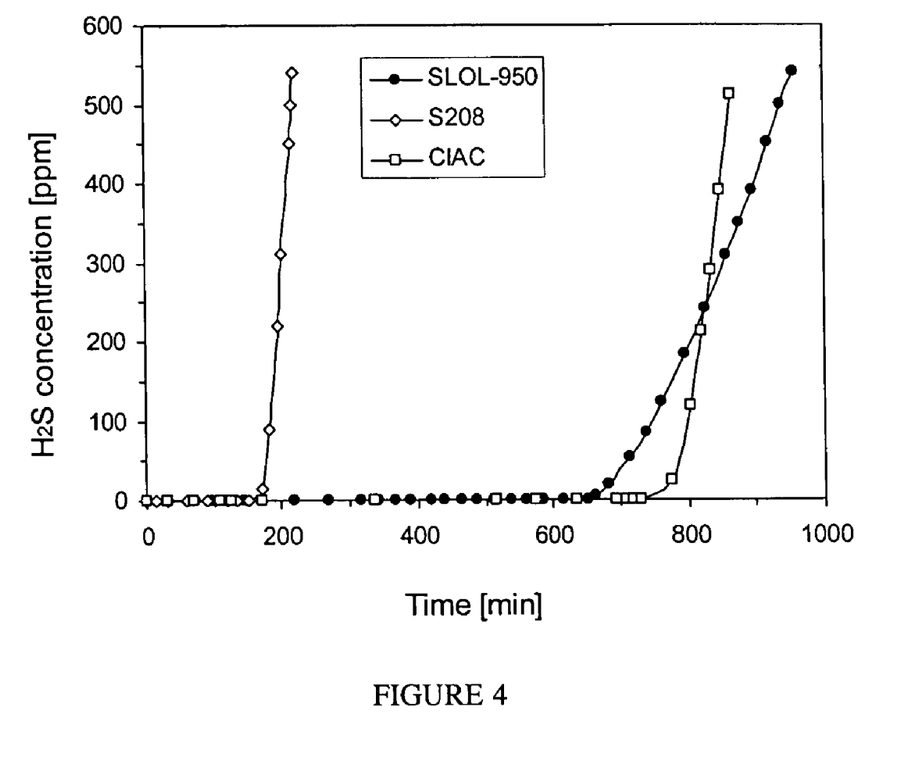
FIG. 4. $H_2S$ breakthrough curves for adsorbent obtained from sewage sludge derived fertilizer treated with mineral oil and pyrolyzed at 950° C. (SLOL-950), caustic impregnated activated carbon (CIAC), and coconut-based carbon (S-208).

FIG. 4 shows a comparison of the H$_2$S breakthrough curves for SLOL-950, S-208 and caustic impregnated activated carbon (CIAC). As illustrated by FIG. 4, the adsorbent obtained from sewage sludge derived fertilizer treated with mineral oil (SLOL-950) has a comparable capacity to that of caustic impregnated activated carbon (CIAC) and a higher capacity than that of coconut shell-based carbon (S-208).

Figure 5:
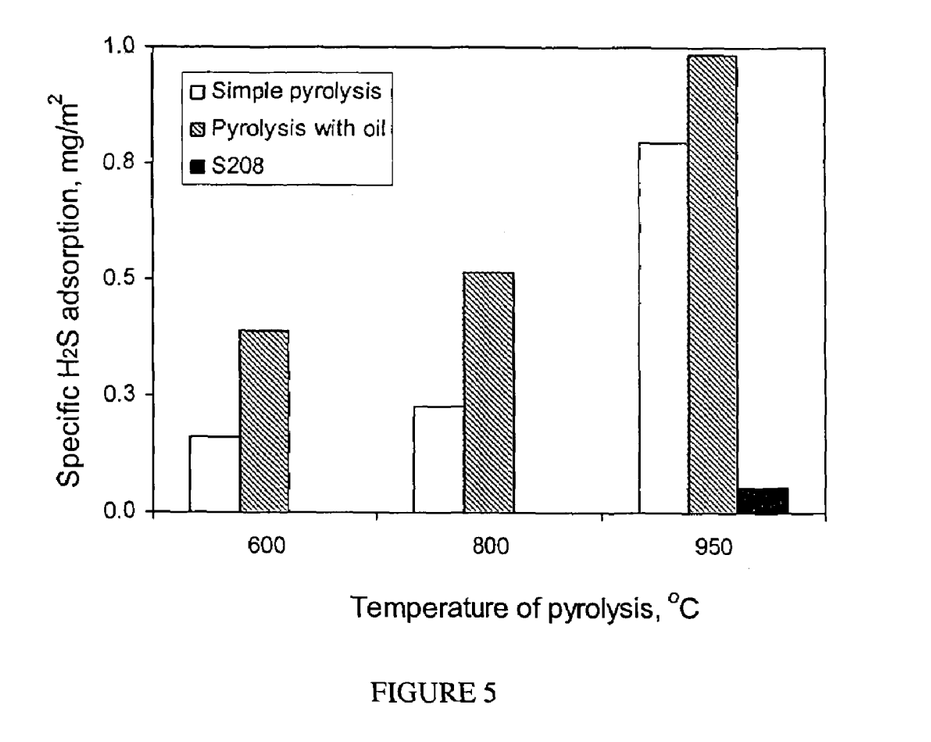
FIG. 5. Comparison of specific $H_2S$ breakthrough capacity for adsorbents obtained from sewage sludge derived fertilizer treated with mineral oil and pyrolyzed at 600° C., 800° C. and 950° C. (pyrolysis with oil), and for adsorbents obtained from sewage sludge derived fertilizer without mineral oil treatment pyrolyzed at 600° C., 800° C. and 950° C. (simple pyrolysis), and for coconut based carbon (S-208).

FIG. 5 compares specific capacities for H$_2$S adsorption obtained for materials treated with mineral oil pyrolyzed at 600° C., 800° C. and 950° C. (SLOL-600, SLOL-800 and SLOL-850, pyrolysis with oil) to those obtained using simple pyrolysis (no mineral oil treatment) at the same temperatures. Coconut shell-based carbon (S-208) is also included for comparison at 950° C. The H$_2$S adsorption capacities of the mineral oil-treated samples are higher than those obtained using simple pyrolysis at each temperature. In the case of SLOL- 950, the performance is approximately 30% better when compared to SC-950 (sample obtained by simple pyrolysis at 950° C., without mineral oil).

Figure 6:
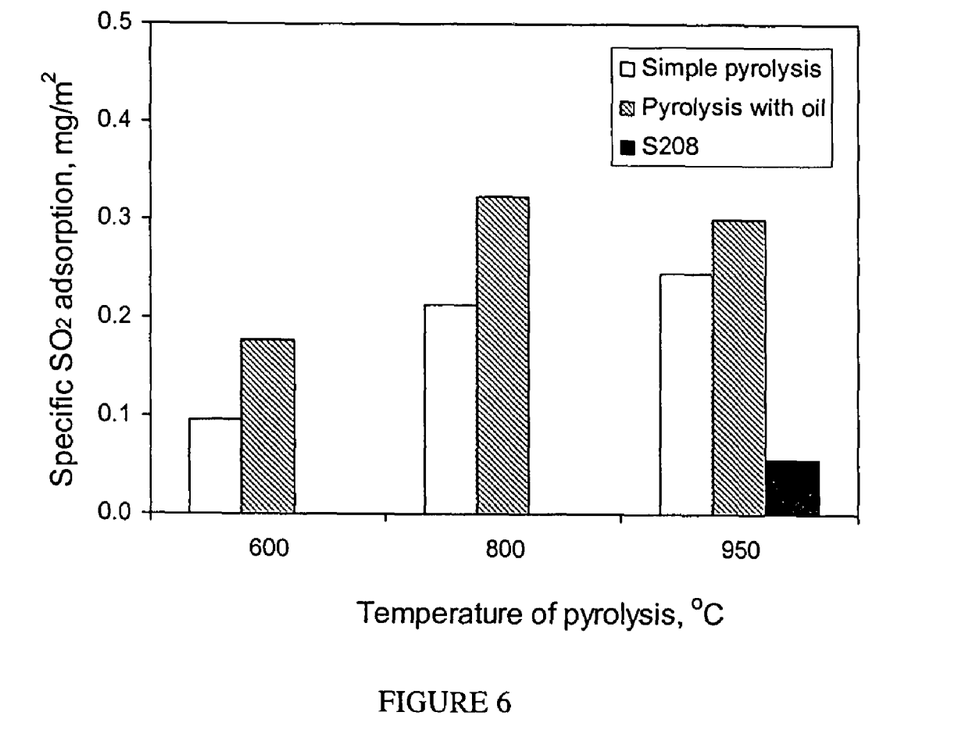
FIG. 6. Comparison of specific $SO_2$ breakthrough capacity for adsorbents obtained from sewage sludge derived fertilizer treated with mineral oil and pyrolyzed at 600° C., 800° C. and 950° C., (pyrolysis with oil) and for adsorbents obtained from sewage sludge derived fertilizer without mineral oil treatment pyrolyzed at 600° C., 800° C. and 950° C. (simple pyrolysis).

Similar enhancement is found for SO$_2$ adsorption. As seen from FIG. 6, for all mineral oil-treated samples (pyrolysis with oil), a significant increase in the SO$_2$ adsorption capacity (about 20%) is observed compared to non-mineral oil-treated samples pyrolyzed at the same temperature (simple pyrolysis). The results obtained for the mineral oil-treated samples pyrolyzed at 800° C. and 950° C. (SLOL-800 and SLOL-950) are comparable.

Without wishing to be bound by theory, this increased adsorption capacity of the mineral oil-treated samples is believed to be caused by rearrangement within the organic phase during pyrolysis of sewage sludge in the presence of oil. An analysis of the performance of mineral oil-treated samples pyrolyzed at 600° C., 800° C. and 950° C. indicates that significant chemical changes in the nature of the adsorbent occur between 800° C. and 950° C., resulting in an increase in the H$_2$S adsorption capacity of the mineral oil-treated sample pyrolyzed at 950° C. The surface area and micropore volume increase 20% for SLOL-950 compared to SLOL-800.

Figure 7:
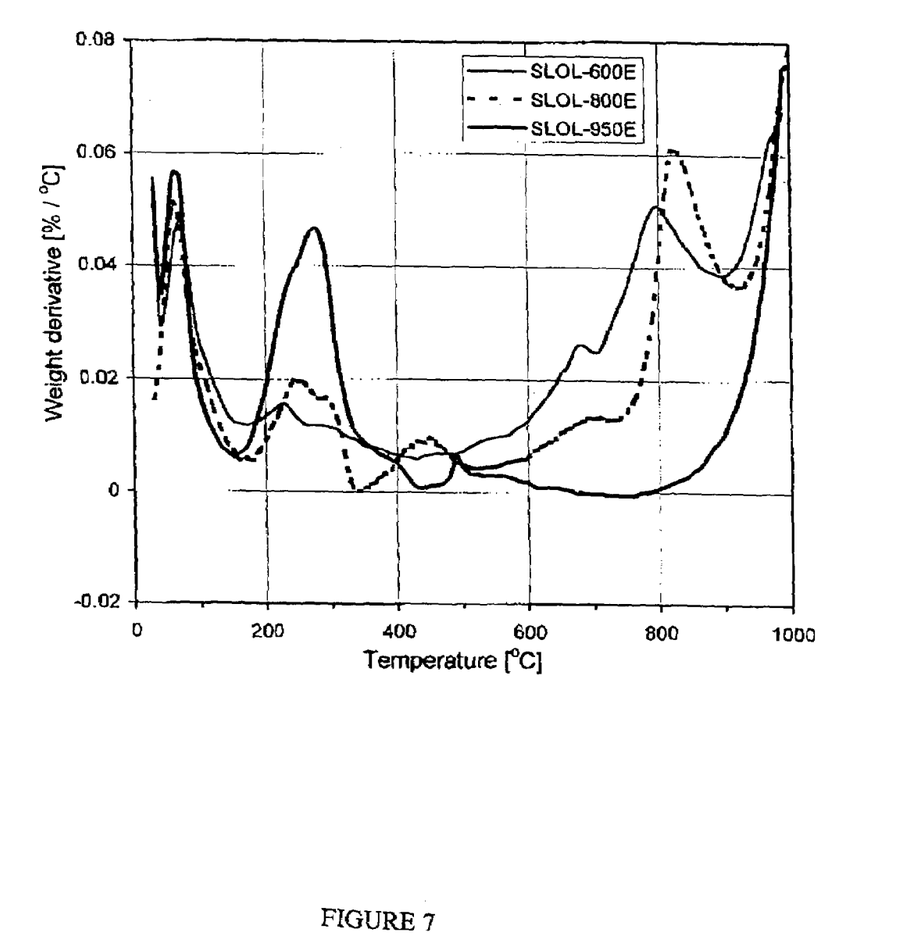
FIG. 7. Differential Thermogravimetric Analysis (DTG) curves (nitrogen atmosphere) for exhausted adsorbents obtained from sewage sludge derived from fertilizer treated with mineral oil and pyrolyzed at 600° C., 800° C. and 950° C. (SLOL-600E, SLOL-800E, SLOL-950E).

Thermal analysis of the exhausted samples after H$_2$S adsorption (designated by the letter E in Table 4) is given in FIG. 7. In the case of SLOL-950E, a significant weight loss between 150 and 400° C. is observed. This is due to the presence of elemental sulfur. When present in small pores, elemental sulfur does not form S$_6$ or S$_8$ chain or ring polymers, and therefore vaporizes at a lower temperature than solid sulfur. A small weight loss at approximately 480° C. is related to the decomposition of iron sulfate. In the case of SLOL-800E, the peak between 200° C. and 350° C. also represents removal of elemental sulfur. The peaks at 300° C., 450° C., and 680° C. represent the decomposition of salts formed during the reaction of H$_2$S and sulfuric acid with surface oxides and hydroxides.

Figure 8:
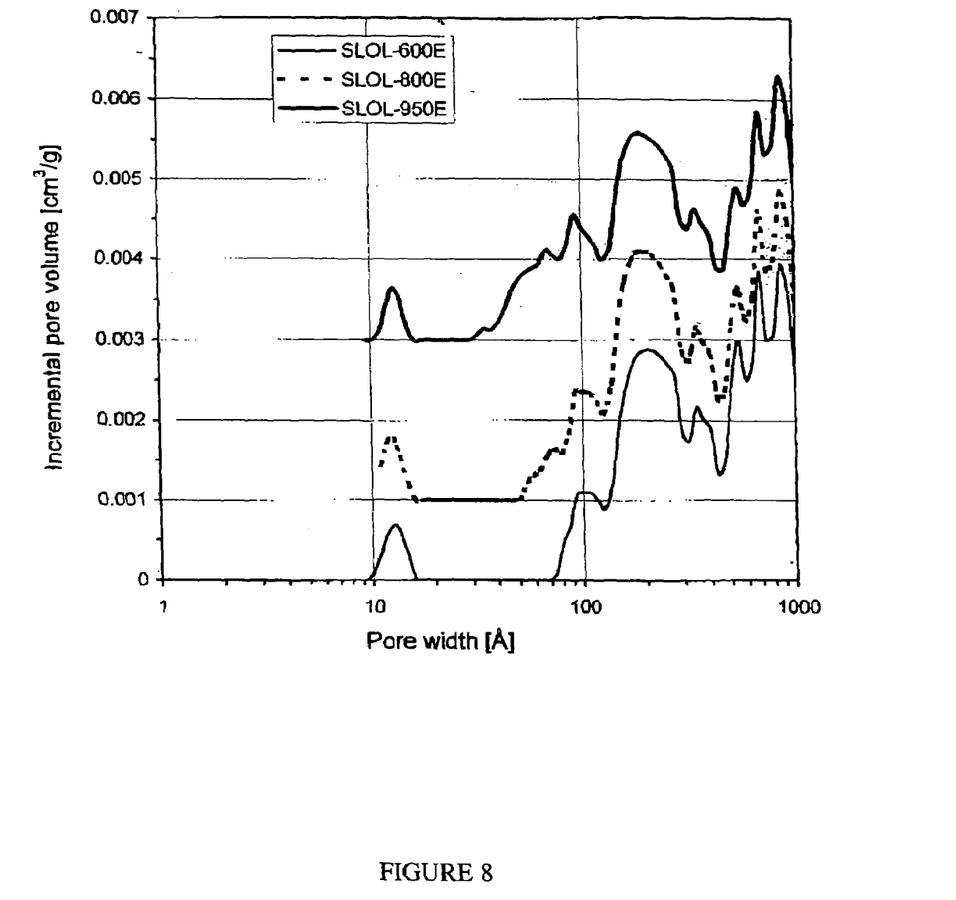
FIG. 8. Pore size distributions for exhausted adsorbents obtained from sewage sludge derived from fertilizer treated with mineral oil and pyrolyzed at 600° C., 800° C. and 950° C. (SLOL-600E, SLOL-800E, SLOL-950E).

The pore size distributions for the exhausted oil-treated adsorbents are given in FIG. 8. Comparing this with the data presented in FIG. 3, it can be seen that after H$_2$S adsorption, all small pores (<20 Å) almost disappear. In the case of SLOL-950, the mesopores between 20 and 70 Å in size are also active in the adsorption process. These pores are unique to the SLOL-950 material, and are not present in the samples pyrolyzed at lower temperatures. Once the small pores in the SLOL-950 adsorbent are filled, sulfur continues to deposit on the surface of the material.

The structural parameters for the exhausted samples are also presented in Table 4. For the exhausted samples, the volume of the micropores disappears almost completely, suggesting that the process occurs until all micropores are gradually filled by the oxidation product. On the surface of the adsorbent, H$_2$S is chemically bonded to metal compounds creating stable sulfides and sulfide-like species. The surface, due to the presence of catalytic metals and basic nitrogen groups, catalyzes oxidation of the H$_2$S. This oxidation product is likely sulfur since the pH of the materials' surface is still basic after exhaustion. Table 4 shows the changes in surface area and pore volume before and after H$_2$S adsorption.

The results obtained for samples exhausted after SO$_2$ adsorption are also included in Table 4. After SO$_2$ adsorption, the surface areas and pore volumes of the adsorbent materials decreases, as a result of deposition of oxidation products in the micropores. These oxidation products are likely sulfuric acid salts such as iron and calcium sulfates, whose presence decreases the pH of the exhausted samples.

The structural parameters given in Table 4 were used to calculate the specific capacities for H$_2$S and SO$_2$ adsorption presented in FIGS. 4 and 5.

Figure 9:
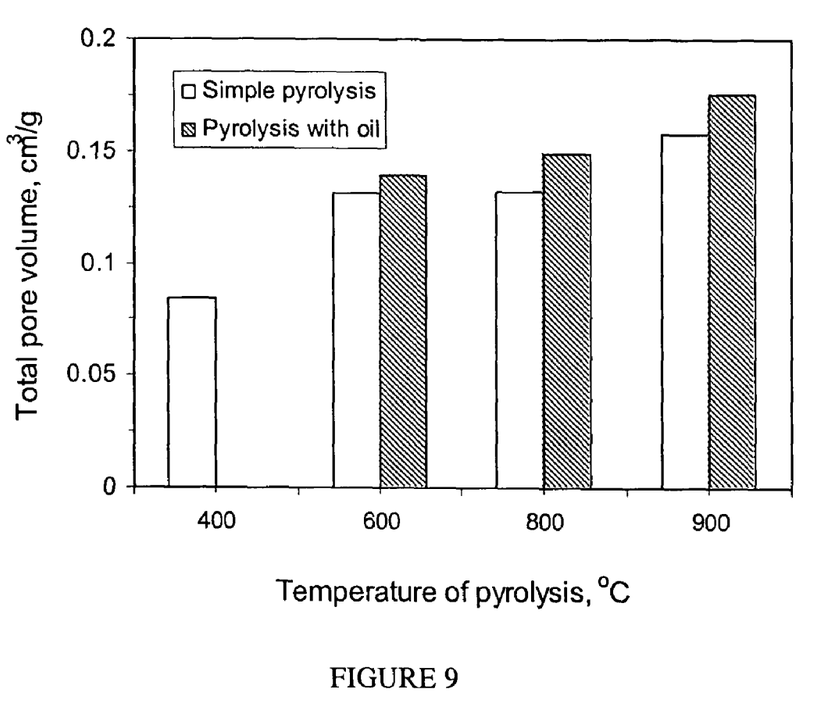
FIG. 9. Changes in the total pore volume with pyrolysis temperature for adsorbents obtained from sewage sludge derived fertilizer treated with mineral oil (pyrolysis with oil) in comparison with the materials obtained using sewage sludge derived fertilizer without mineral oil treatment (simple pyrolysis).

For the materials studied, an increase in the surface area and total pore volume occurs with an increasing pyrolysis temperature (see FIG. 9) due to the changes in the mineral phase (decomposition of salts, oxides, formation of spinellike compounds, etc.) and an increase in the degree of aromatization of organic matter.

The present invention is not to be limited in scope by the specific embodiments described herein. Various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference.

What is claimed is:

1. A process for removing one or more acidic gas or gases from wet gas streams comprising:
    (a) forming an adsorbent by thermally drying dewatered sewage sludge to form granulated organic fertilizer;
    (b) treating the fertilizer with mineral oil;
    (c) pyrolyzing the treated fertilizer at a pyrolysis temperature between about 600° C. and about 1000° C.;
    (d) contacting the adsorbent with a wet gas stream; and
    (e) allowing the adsorbent to adsorb the acidic gas or gases.

2. The process of claim 1, wherein the acidic gases are selected from the group consisting of hydrogen sulfide, methyl mercaptan, sulfur dioxide, hydrogen cyanide, nitrogen dioxide, and mixtures thereof.

3. The process of claim 1, wherein the acidic gas comprises hydrogen sulfide which reacts with inorganic matter to be oxidized to sulfur dioxide or elemental sulfur or salt forms thereof.

4. The process of claim 1, wherein the acidic gas comprises sulfur dioxide.

5. The process of claim 1, wherein the wet gas stream is effluent from a sewage treatment plant, gaseous fuel, or gases from hydrothermal vents.

6. The process of claim 1, wherein the pyrolysis temperature is between about 800° C. and about 950° C.

7. The process of claim 1 further comprising:
    (f) regenerating the adsorbent by heating the adsorbent to a heating temperature.

8. The process of claim 7, wherein the heating temperature is between about 300° C. and about 500° C.

9. The process of claim 1, wherein the mineral oil is selected from light mineral oil, heavy mineral oil, natural mineral oil, synthetic mineral oil, spent motor oil, and combinations thereof.

10. A process for making an adsorbent, comprising:
    (a) thermally drying dewatered sewage sludge to form granulated organic fertilizer;
    (b) treating the fertilizer with mineral oil;
    (c) pyrolyzing the treated fertilizer at a pyrolysis temperature between about 600° C. and about 1000° C.

11. The process of claim 10, wherein step (b) comprises treating the granulated organic fertilizer with between about 5 and about 30 wt % mineral oil.

12. The process of claim 11, wherein step (b) is conducted at a temperature of between about 20° C. and about 100° C. for a period of time between about 1 hour and about 24 hours.

13. The process of claim 10, wherein the pyrolysis temperature is maintained for a period of time between about 0.5 and about 4 hours.

14. The process of claim 10, wherein the pyrolysis temperature is between about 800° C. and about 950° C. and the pyrolysis temperature is maintained for a period of time between about 0.5 and about 2 hours.

15. The process of claim 10, wherein step (c) comprises pyrolyzing the treated fertilizer at a heating rate of between about 1 and about 50° C./minute.

16. The process of claim 10, wherein step (c) comprises pyrolyzing the treated fertilizer at a heating rate of between about 10 and about 30° C./minute.

17. The process of claim 10, wherein the pyrolysis is continued until no flame is observed from the combustion of exhaust gases.

18. The process of claim 1, wherein the mineral oil comprises a $C_{14}$–$C_{18}$ petroleum hydrocarbon product, optionally containing one or more heteroatoms selected from sulfur, oxygen and nitrogen, having a boiling point of about 270° C. to about 360° C.

19. The process of claim 10, wherein the mineral oil is selected from light mineral oil, heavy mineral oil, natural mineral oil, synthetic mineral oil, spent motor oil, and combinations thereof.

20. An adsorbent formed by the process of claim 10.

* * * * *